US006714389B1

(12) United States Patent
Pokhil et al.

(10) Patent No.: US 6,714,389 B1
(45) Date of Patent: Mar. 30, 2004

(54) DIGITAL MAGNETORESISTIVE SENSOR WITH BIAS

(75) Inventors: Taras Grigorievich Pokhil, Arden Hills, MN (US); Andrzej A. Stankiewicz, Edina, MN (US); Janusz J. Nowak, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 156 days.

(21) Appl. No.: 10/003,730

(22) Filed: Oct. 30, 2001

Related U.S. Application Data (60) Provisional application No. 60/245,050, filed on Nov. 1, 2000.

(51) Int. Cl.[7] .................................................. G11B 5/39
(52) U.S. Cl. .................................. 360/324.12; 360/327
(58) Field of Search ........................... 360/324.12, 327, 360/327.1, 327.3–327.33

(56) References Cited

U.S. PATENT DOCUMENTS

| | | | | | |
|---|---|---|---|---|---|
| 4,296,447 | A | * | 10/1981 | Lewis | 360/66 |
| 4,949,039 | A | * | 8/1990 | Grunberg | 324/252 |
| 5,134,533 | A | | 7/1992 | Friedrich et al. | |
| 5,159,513 | A | | 10/1992 | Dieny et al. | |
| 5,283,521 | A | | 2/1994 | Ottesen et al. | |
| 5,287,238 | A | | 2/1994 | Baumgart et al. | |
| 5,406,433 | A | * | 4/1995 | Smith | 360/315 |
| 5,432,373 | A | * | 7/1995 | Johnson | 257/421 |
| 5,442,508 | A | * | 8/1995 | Smith | 360/314 |
| 5,546,253 | A | | 8/1996 | Che | |
| 5,583,725 | A | | 12/1996 | Coffey et al. | |

(List continued on next page.)

FOREIGN PATENT DOCUMENTS

| | | | | | |
|---|---|---|---|---|---|
| JP | 57187671 | A | * | 11/1982 | G01R/33/02 |
| JP | 05175572 | A | * | 7/1993 | H01L/43/08 |
| JP | 07192229 | A | * | 7/1995 | G11B/5/39 |
| JP | 07320248 | A | * | 12/1995 | G11B/5/596 |
| JP | 08306011 | A | * | 11/1996 | G11B/5/39 |
| JP | 11007611 | A | * | 1/1999 | G11B/5/39 |
| JP | 11007614 | A | * | 1/1999 | G11B/5/39 |
| JP | 11025430 | A | * | 1/1999 | G11B/5/39 |
| JP | 11102508 | A | * | 4/1999 | G11B/5/39 |

OTHER PUBLICATIONS

Galkina et al., "On the Quasistochastic Behavior of Non–linear Magnetization Oscillations in Orthorhombic Ferromagnets Induced by a Magnetic Pulse Field," *Phys. Stat. Sol.*, 1994, 181:477–484.

Ivanov et al., "Dynamic domain reorientation in pulsed magnetic fields," *JETP Lett.*, 1992, 56(4):198–202.

Stankiewicz et al., "Domain structure changes in a large pulse in–plane field," *J. Magnetism Magnetic Materials*, 1996, 157/158:357–358.

*Primary Examiner*—William Klimowicz
(74) *Attorney, Agent, or Firm*—Moser, Patterson & Sheridan, LLP (57) ABSTRACT

A magnetoresistive sensor for sensing a magnetic storage medium includes a free layer that has a magnetic anisotropy that supports stable magnetic states. A magnetic field generator biases the stable states of the free layer. The magnetic field generator may permanently bias the free layer through the use of permanent magnets or may intermittently bias the free layer with a magnetic field generated by an alternating current. A magnetic storage medium is located proximate to the magnetoresistive sensor. The magnetoresistive sensor switches between stable magnetic states in response to the data on the magnetic storage medium. The magnetoresistive sensor senses the data stored in sectors on a magnetic medium by magnetically biasing the free layer, positioning the sensor proximate to a sector of the magnetic medium to be sensed, removing the magnetic bias and then sensing the magnetic state of the free layer while the magnetic bias is removed.

28 Claims, 7 Drawing Sheets

U.S. PATENT DOCUMENTS

| | | |
|---|---|---|
| 5,585,986 A | 12/1996 | Parkin |
| 5,633,770 A | 5/1997 | Che |
| 5,648,885 A | 7/1997 | Nishioka et al. |
| 5,701,223 A * | 12/1997 | Fontana et al. .......... 360/324.11 |
| 5,745,408 A * | 4/1998 | Chen et al. ................. 365/173 |
| 5,768,069 A * | 6/1998 | Mauri ........................ 360/314 |
| 5,768,181 A * | 6/1998 | Zhu et al. ................... 365/158 |
| 5,856,896 A | 1/1999 | Berg et al. |
| 5,920,446 A * | 7/1999 | Gill ........................... 360/324 |
| 6,025,979 A * | 2/2000 | Yamane et al. ........... 360/324.1 |
| 6,114,719 A * | 9/2000 | Dill et al. ................... 257/295 |
| 6,134,090 A | 10/2000 | Mao et al. |
| 6,169,647 B1 | 1/2001 | Mao et al. |
| 6,181,533 B1 | 1/2001 | Pokhil |
| 6,191,926 B1 | 2/2001 | Everitt et al. |
| 6,256,177 B1 * | 7/2001 | Urai et al. ............. 360/324.12 |
| 6,256,178 B1 * | 7/2001 | Gill ......................... 360/324.2 |
| 6,449,131 B2 * | 9/2002 | Guo et al. ................. 360/315 |

* cited by examiner

DIGITAL MAGNETORESISTIVE SENSOR WITH BIAS

CROSS-REFERENCE TO RELATED APPLICATIONS

This application claims priority to U.S. Provisional Application Ser. No. 60/245,050, on Nov. 1, 2000, entitled "Digital Magnetic Field Sensor With DC And/Or AC Bias," which is hereby incorporated by reference as though fully set forth herein.

TECHNICAL FIELD

This invention relates to magnetoresistive sensors used in data storage systems.

BACKGROUND

Magnetic sensors utilizing the giant magnetoresistive (GMR) effect or tunneling magnetoresistive (TMR) effect, also known as spin valve sensors, are known in the art. A spin valve sensor is typically a layered structure consisting of at least two ferromagnetic layers separated by a thin non-ferromagnetic layer. One of the ferromagnetic layers, called the pinned layer, has the orientation of its magnetic field fixed in direction. The other ferromagnetic layer, called the free layer, has the orientation of its magnetic field allowed to rotate in response to the presence of external magnetic fields. In a GMR sensor, the resistance of the sensor varies as a function of the angular difference between the magnetic orientation of the pinned layer and the free layer. This change in resistance may be detected by, for example, the application of a sense current to the sensor and a measurement of the corresponding voltage across the sensor.

Magnetoresistive sensors are used to read data stored as magnetic fields on magnetic storage media. The magnetic response of such a magnetoresistive sensor to the field emanating from the magnetic storage medium must be free from magnetic noise and at the same time have adequate amplitude.

Such magnetoresistive sensors may operate on analog or digital principles. In digital magnetoresistive sensors a digital magnetic switching layer is formed such that it has an axis of magnetic orientation substantially parallel to the magnetic orientation of a pinned layer or layers. The switching layer has two stable states for its magnetization direction. These states are either parallel or antiparallel to the magnetic orientation of the pinned layer, providing a substantially two-state or digital output according to the polarity of the magnetic fields on the magnetic storage media.

SUMMARY

Generally, the invention is directed to a digital magnetoresistive sensor with a magnetic field generator applying a bias to the sensor. The biased magnetoresistive sensor may be used, for example, to sense a magnetic storage medium. The magnetoresistive sensor has a free layer that has a magnetic anisotropy that supports stable magnetic states. The magnetic field generator biases the stable magnetic states of the magnetoresistive sensor. A magnetic storage medium may be located in proximity to the magnetoresistive sensor.

In another aspect, the invention is directed to a data storage system that includes a magnetic storage medium faith data stored on it as varying magnetic fields. A magnetoresistive sensor is maintained proximate to the storage medium during relative motion between the magnetoresistive sensor and the storage medium. The magnetoresistive sensor has a free layer with a magnetic anisotropy that supports two stable states. A magnetic field generator biases the stable states. The magnetoresistive sensor enters the biased stable states in response to the stored data on the magnetic storage medium. Readback circuitry communicates with the magnetoresistive sensor, determining the value of the stored data based upon the magnetic state of the magnetoresistive sensor.

In a further aspect, the invention is directed to a method of sensing magnetic signals. A magnetoresistive sensor is provided. The magnetoresistive sensor has a free layer that supports two stable magnetic states. A magnetic bias field is applied to the free layer, biasing the stable magnetic states. A magnetic source field is applied proximate to the magnetoresistive sensor which causes the free layer to enter a biased stable state in response to changes in the magnetic source field.

The details of one or more embodiments of the invention are set forth in the accompanying drawings and the description below. Among other advantages of the sensor, the digital response of the sensor provides high efficiency. In response to media field magnetization the magnetization of the free layer of the magnetoresistive sensor switches between two opposite or close to opposite directions, thus providing maximal or close to maximal sensor response. The digital response of the sensor also makes it less sensitive to noise sources. In particular it is less sensitive to media field noise that is below the threshold field and it significantly reduces the side reading effect, which is the reading of a data signal from a track adjacent to the desired track. The signal induced in the sensor by data in adjacent tracks is lower than that induced by the track under the sensor, and is an example of a noise source to which the sensor exhibits reduced sensitivity. The biased digital sensor provides additional advantages, such as a high rate of data throughput, due to reduction of the detected field threshold. The digital sensor with bias generated by alternating bias current or alternating bias current in conjunction with permanent bias can provide improved control over the sensor magnetic behavior, both in terms of the stability and switching behavior. It combines high sensor efficiency with fast and noise-free switching of sensor magnetization. Other features, objects, and advantages of the invention will be apparent from the description and drawings, and from the claims.

DETAILED DESCRIPTION

Figure 1:
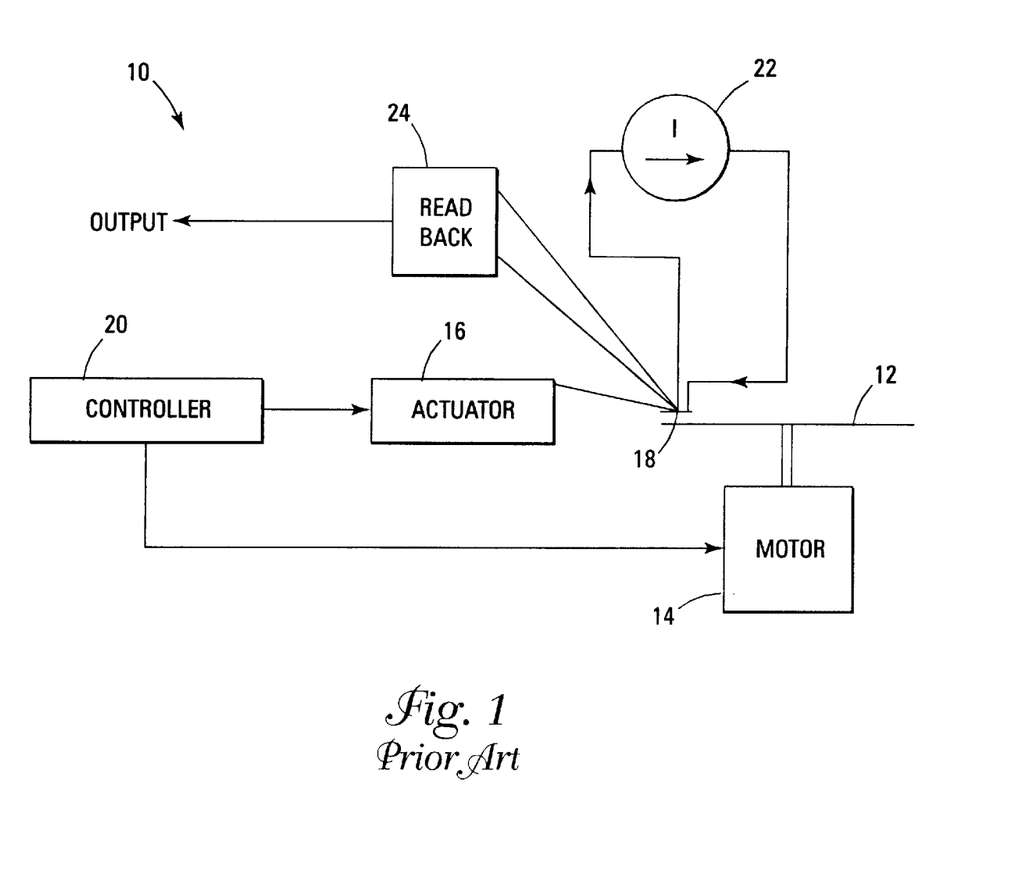
FIG. 1 is a combined block and pictorial diagram of a data storage system.

A new magnetoresistive sensor in accordance with the invention may be used in a known data storage system such as data storage system 10 shown in FIG. 1. System 10 includes storage medium 12 with data stored thereon in the form of variations in a magnetic field on the storage medium 12. Storage medium 12 may be a magnetic disc which is rotated by motor 14. An actuator 16 operates on slider 18 which is used to position a magnetoresistive sensor (not shown in FIG. 1) attached to the slider 18. The slider 18 thus maintains the magnetoresistive sensor proximate to the surface of storage medium 12 during relative motion between the magnetoresistive sensor and the storage medium 12. A controller 20 controls positioning of actuator 16 and thus the slider 18. The magnetoresistive sensor operates by receiving a sense current I from current source 22. Variations in a magnetic field applied to the magnetoresistive sensor due to magnetization of disc 12 cause a change in the magnetic state of the magnetoresistive sensor and thus, in accordance with known principles governing magnetoresistive sensors, the electrical resistance of the sensor. This change in electrical resistance is detected with readback circuitry 24 which responsively determines the value of the stored data based upon the magnetic state of the magnetoresistive sensor and produces an indication of the determined value at its "output."

Figure 2:
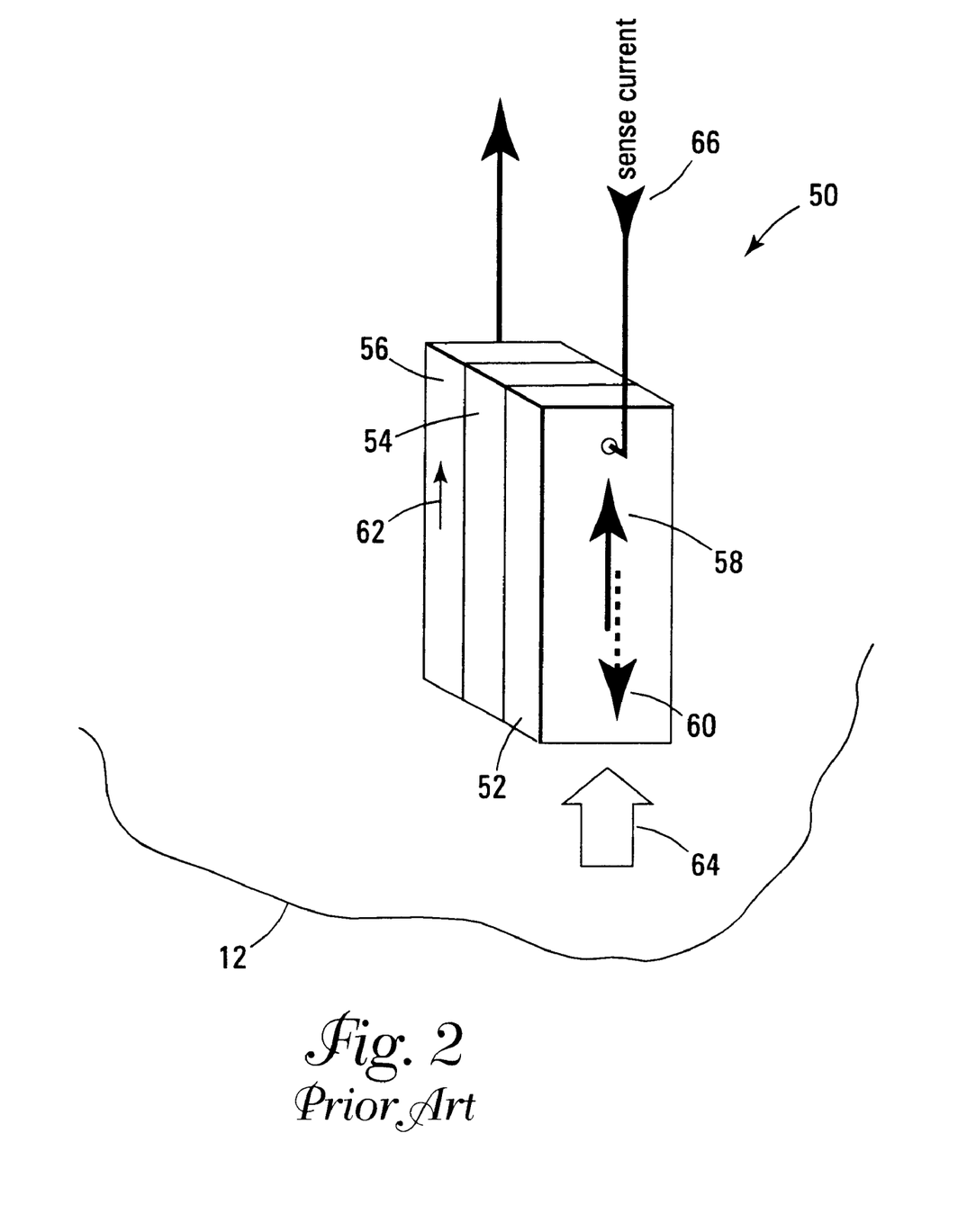
FIG. 2 is a perspective view of a magnetoresistive sensor, which may be used with the system of FIG. 1.

FIG. 2 shows a known magnetoresistive sensor 50 that may be used in embodiments of the present invention. Magnetoresistive sensor 50 is shown in proximity to storage medium 12. An exemplary magnetic field vector 64 representative of data stored on storage medium 12 is shown on storage medium 12. Magnetoresistive sensor 50 includes free layer 52, conducting spacer 54, and pinned layer 56. The various layers of magnetoresistive sensor 50 comprise any appropriate materials to achieve desired GMR or TMR characteristics. The free layer 52 is shown with a uniaxial magnetic anisotropy axis perpendicular to the storage medium 12, shown below magnetoresistive sensor 50. The uniaxial anisotropy may be a shape anisotropy or an intrinsic anisotropy due to the sensor material. The anisotropy supports two stable magnetic states, denoted as first stable magnetic state 58 and second stable magnetic state 60. Free layer 52 magnetization in these states is oriented approximately perpendicular to storage medium 12 as shown in FIG. 2. Pinned layer 56 has a magnetic orientation vector 62 fixed in an orientation approximately parallel or antiparallel to the stable magnetic states of the free layer 52.

Free layer 52, conducting spacer 54, and pinned layer 56 may be in the form of thin films. As depicted in FIG. 2, the free layer 52, conducting spacer 54 and pinned layer 56 may be arranged in a laminate structure with the free layer 52 and pinned layer 56 forming the outer layers of the laminate and the conducting spacer 54 forming the inner layer of the laminate. The free layer 52, conducting spacer 54, and pinned layer 56 thus form three parallel planes when laminated in this manner.

In operation, the magnetic state of the free layer 52 switches between first and second stable magnetic states 58 and 60 in response to variations in the magnetic field on the storage medium 12, when such variations exceed a threshold level. A magnetic field 64 on the storage medium 12 that exceeds a positive threshold value causes the state of the free layer 52 to enter the first stable magnetic state 58, while a magnetic field on the storage medium 12 that is below a negative threshold value causes the state of the free layer 52 to enter the second stable magnetic state 60. Sense current 66 is transmitted through the magnetoresistive sensor 50. Readback circuitry 24 (see FIG. 1) detects the resistance level based on measurements of the sense current 66 and thus detects the magnetic state of the magnetoresistive sensor 50. FIG. 2 depicts the sense current 66 perpendicular to the plane of the layers of the magnetoresistive sensor 50. The sense current 66 may also be transmitted in the plane of the magnetoresistive sensor 50. Current-in-plane (CIP) and current-perpendicular-to-plane are two known configurations of magnetoresistive sensors.

Figure 3:
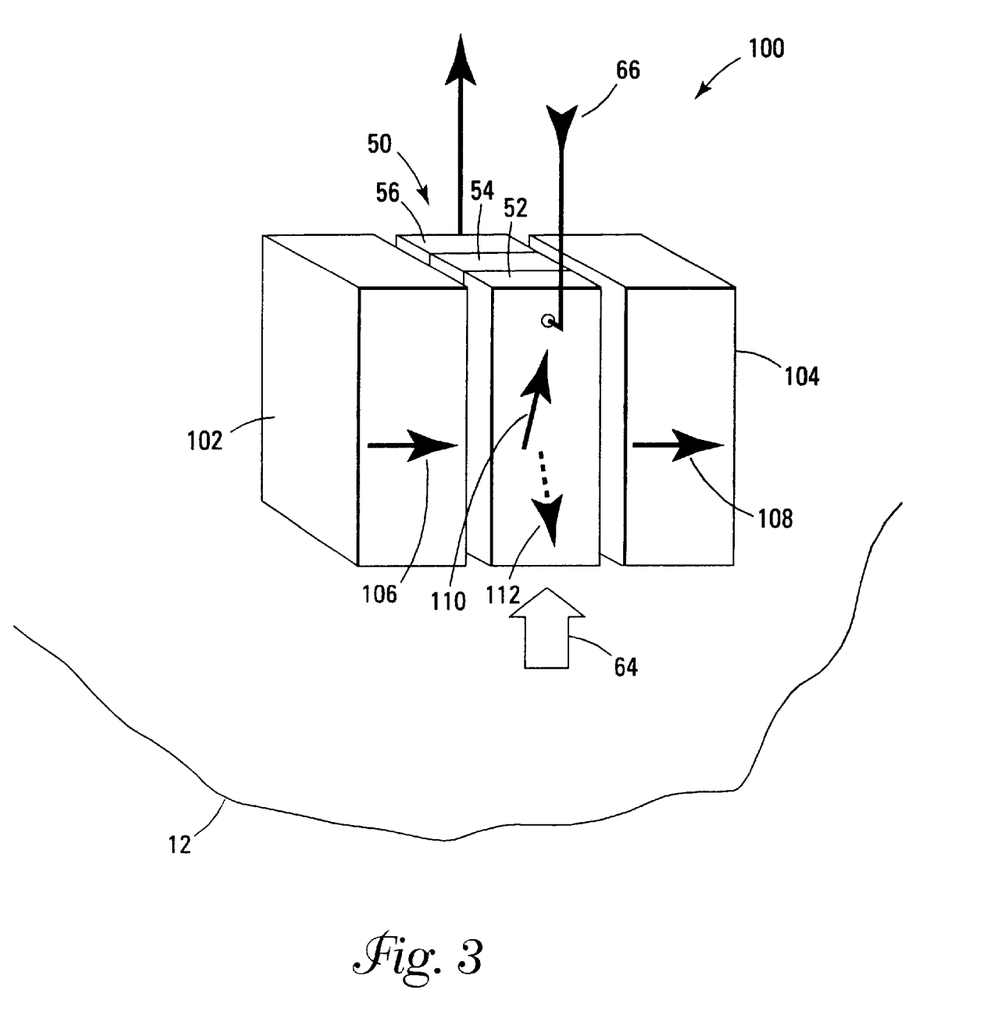
FIG. 3 is a perspective view of a biased magnetoresistive sensor in accordance with the invention, which includes the sensor of FIG. 2 and may be used in the system of FIG. 1.

In FIG. 3, a biased magnetoresistive sensor 100 in accordance with the invention incorporates the magnetoresistive sensor 50 depicted in FIG. 2. Magnet 102 and magnet 104 act as magnetic field generators to magnetically bias the free layer 52 of the biased magnetoresistive sensor 100. The magnetic field generated by magnets 102 and 104 may be accomplished, for example, by exchange with antiferromagnets. An antiferromagnetic layer may be placed adjacent to the free layer 52, which will apply a bias field to the free layer in a direction parallel to the surface of storage medium 12. Magnets 102 and 104 may have, as shown in FIG. 3, magnetic field orientations 106 and 108 perpendicular to stable magnetic state 58 and stable magnetic state 60 of the free layer 52. (See FIG. 2). The bias due to the magnets 102 and 104 causes the stable magnetic states of the free layer 52 to rotate slightly to a first stable biased magnetic state 110 and a second stable biased magnetic state 112 (See FIG. 3).

In operation, the magnetic state of the free layer 52 switches between first stable biased magnetic state 110 and second stable biased magnetic state 112 in response to variations in the magnetic field 64 on the storage medium 12, when such variations exceed a threshold level. A magnetic field 64 on the storage medium 12 that exceeds a positive threshold value causes the state of the free layer 52 to enter the first stable biased state 110, while a magnetic field 62 on the storage medium 12 that is below a negative threshold value causes the state of the free layer 52 to enter the second stable state 112. Compared to using just the unbiased magnetoresistive sensor 50 shown in FIG. 2, the bias caused by magnets 102 and 104 reduces the threshold magnitude of the detected magnetic field 64 necessary to cause the magnetic state of the free layer 52 to switch between stable biased magnetic states 110 and 112 and also lowers the time necessary for to switch between states (see FIG. 6). This increases the data throughput rate of the biased magnetoresistive sensor 100 compared to the magnetoresistive sensor 50.

Figure 4:
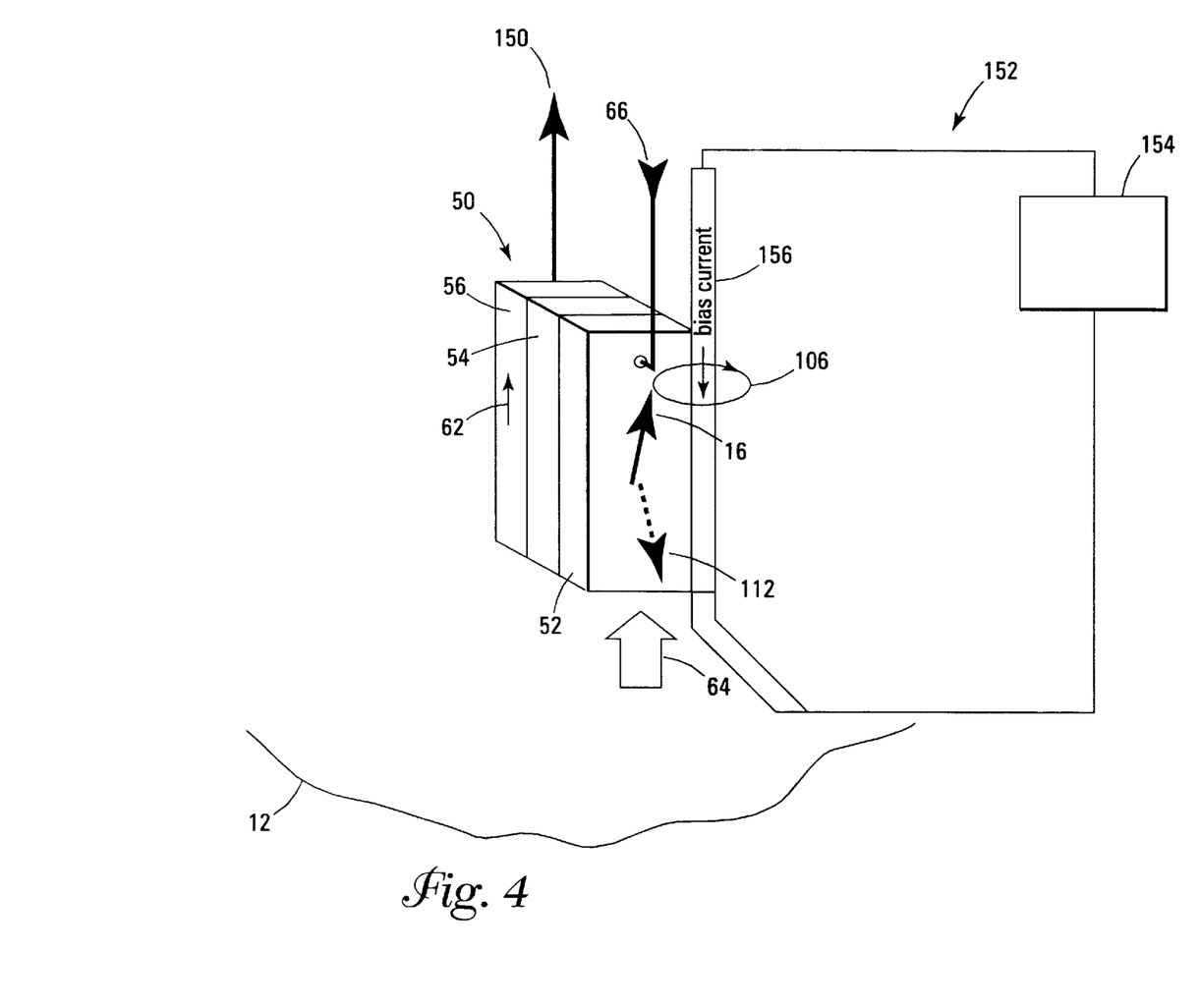
FIG. 4 is a perspective view of another biased magnetoresistive sensor in accordance with the invention, which includes the sensor of FIG. 2 and may be used in the system of FIG. 1.

FIG. 4 depicts an alternative embodiment in which an electrical current acts as a generator of the magnetic biasing field. Biased magnetoresistive sensor 150 incorporates the magnetoresistive sensor 50 depicted in FIG. 2. An AC current source 154 delivers AC current 152 through a current path 156 positioned adjacent to the free layer 52 and parallel to the unbiased stable magnetic states 58 and 60 (see FIG. 2) of the free layer 52. AC current flowing through current path 156 produces a magnetic field that biases the free layer 52 so that is has the two biased stable magnetic states 110 and 112 previously discussed. Since any time-varying current creates such a magnetic field, the alternating bias current 152 created by AC current source 154 is not limited to sinusoidal variations. The alternating bias current 152 creates a magnetic field orientation 106 perpendicular to the unbiased stable magnetic states 58 and 60 of the free layer 52. (See FIG. 2). The stable magnetic states 58 and 60 of the free layer 52 thus rotate to a first stable biased magnetic state 110 and a second stable biased magnetic state 112. Biasing the free layer 52 serves to enable the biased magnetoresistive sensor 150 to respond to changes in the magnetic fields 64 on storage medium 12. The magnetic biasing field generated by alternating bias current 152 rotates free layer 52 magnetization away from an axis perpendicular to storage medium 12 and therefore lowers detected field threshold and decreases sensor switching time. This is the same principle of operation as that employed by the biased magnetoresistive sensor 100 depicted in FIG. 3. The alternating current bias 152 can be applied using a current stripe located near the sensor or by putting the current directly through the sensor. A current stripe can be used to generate a constant magnetic field, an alternating magnetic field or a combination of constant and alternating magnetic field. Those skilled in the art will recognize that the location, orientation, and shape of the current stripe may be varied depending on the sensor design.

Figure 5:
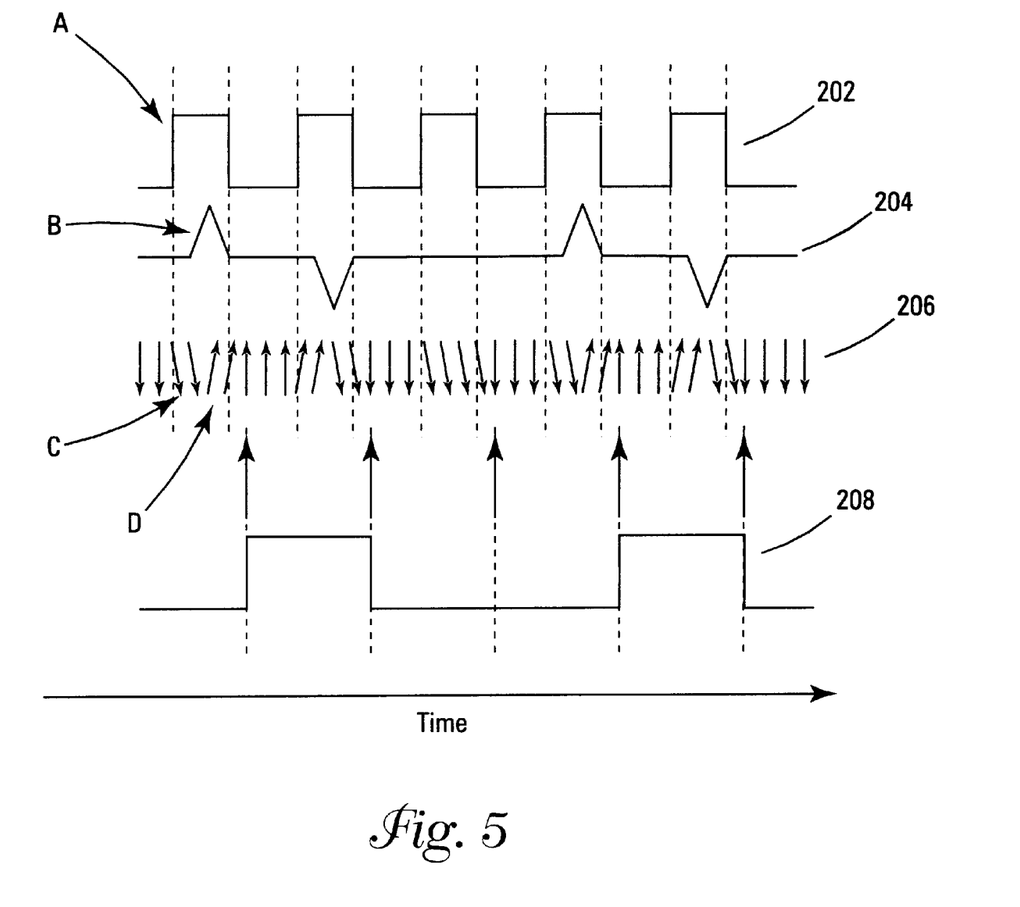
FIG. 5 is a timing diagram showing the signals and magnetization of a biased magnetoresistive sensor in accordance with the invention.

FIG. 5 is a timing diagram depicting a method of reading data stored on media 12 (see FIG. 1) using the biased sensor 150 of FIG. 4. Bias status signal 202 depicts the status of the AC current source 154. Signal 202 being high indicates the presence of alternating bias current 152, and signal 202 being low indicates the absence of alternating bias current 152. The data signal 204 shows the variation in magnetic field from storage medium 12 (see FIG. 1). An upward-pointing triangle indicates a magnetic field associated with data signal 204 oriented toward the magnetoresistive sensor 50, while a downward-pointing triangle indicates a magnetic field associated with data signal 204 oriented away from the magnetoresistive sensor 50. As can be seen by comparing AC current source status signal 202 with data signal 204, the biased sensor 150 is positioned over the media 12 such that the rate at which the bias status signal 202 activates and deactivates is synchronized with the frequency of the data signal 204.

Free layer magnetization status 206 depicts the time history of the magnetization orientation of the free layer 52 (see FIG. 4). When the bias field is absent the sensor magnetization is perpendicular to the storage medium 12 due to the magnetic anisotropy of the sensor, existing in either the first or second stable magnetic state 58 or 60, depicted by vertical arrows on the plot of free layer magnetization 206. The magnetic orientation of the free layer 52 points in the direction of the most recent data signal 204 magnetic field.

When both the bias status signal 202 and data signal 204 are present, magnetization of the free layer 52 of the sensor switches in the direction of the magnetization of the data signal 204, assuming either first biased stable magnetic state 110 or second biased stable magnetic state 112, shown by arrows rotated away from the vertical on the plot of free layer magnetization 206. Since free layer magnetization 206 remains in a stable state until switched to the other stable state, when consecutive bits of data have the same value, it is only necessary to store a data signal 204 corresponding to the first bit in the series of bits.

The left-most pulse on the bias status signal 202, labeled A in FIG. 5, and the left-most pulse of the data signal 204 trace, labeled B in FIG. 5 illustrate the effect on the free layer magnetization status. The activation of pulse A causes the free layer magnetization 206 to enter a biased stable state, labeled C in FIG. 5. The arrival of the data signal B whose magnetic orientation is directed away from the biased stable state C then causes the free layer magnetization 206 to switch to the biased stable state that is oriented in the same direction as the magnetic orientation of the data signal 204, labeled D in FIG. 5.

Readback timing signal 208 shows the state of a signal that enables the readback circuitry 24 of the data storage system 10 to determine the state of the magnetoresistive sensor 150. An arrow indicates the presence of a signal initiating the operation of the readback circuitry 24. The readback timing signal is operated to coincide with intervals corresponding to low levels of the AC current source status signal 202. The magnetic state of the biased magnetoresistive sensor 150 is therefore detected when the bias field is absent. Thus, the readback circuitry 24 operates when the free layer 52 of the magnetoresistive sensor 50 is in one of the stable magnetic states 58 or 60. These states have the greatest angular difference between the magnetic orientation of the free layer 52 and the magnetic orientation of the pinned layer 56. This situation creates the largest possible readout signal.

The signal timing depicted in FIG. 5 affords several advantages. Sensing the data on the magnetic medium only when the bias field is present provides a combination of high sensitivity and low response time. Reading the data with the readback circuitry 24 only when the bias field is absent provides a maximum strength signal in the readback circuitry 24.

In another embodiment, the sensor 100 of FIG. 3 and sensor 150 of FIG. 4 may be combined in a single magnetoresistive sensor. This allows optimization of the efficiency and high frequency performance of the sensor. The use of a permanent bias decreases the required amplitude of the alternating bias current 152 magnetic field. This makes it easier to satisfy the amplitude requirements of the alternating bias current at high frequency.

Figure 6:
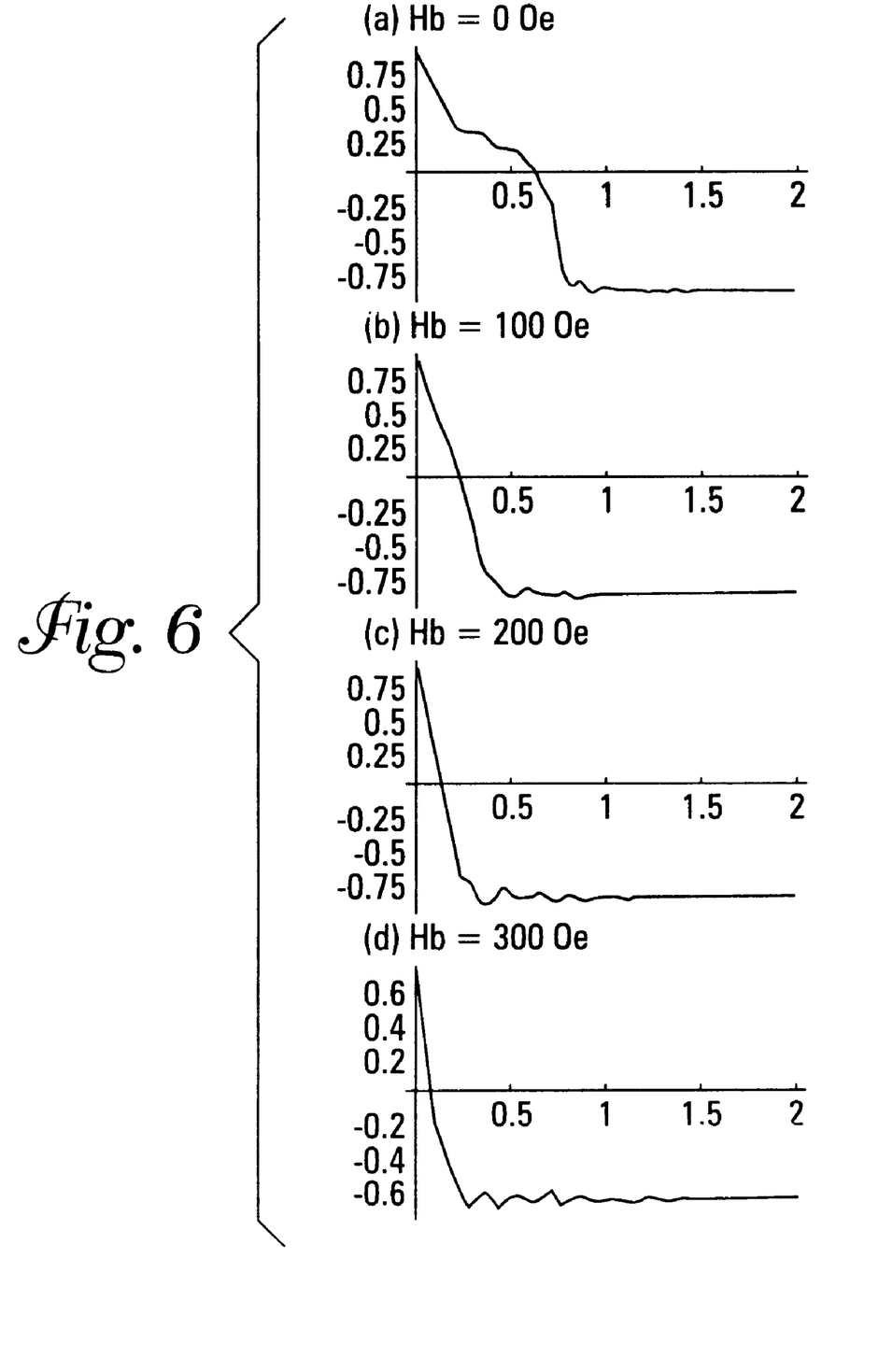
FIG. 6 is a set of graphs showing simulated switching times of a biased magnetoresistive sensor in accordance with the invention.

FIG. 6 shows simulations illustrating the advantageous switching performance discussed above. In these simulations, a free layer of a digital magnetoresistive sensor of dimensions 0.1×0.2 μm×3 nm thick was modeled. The calculations used magnetic parameters approximate to those of a free layer made of NiFe. The modeled sensor had an antiferromagnet adjacent to the pinned layer. The modeled sensor was located between two shields that limit the influence of magnetic transitions in data tracks adjacent to the data track under the sensor. The graphs show the time dependence of the component of free layer 52 magnetization that is oriented perpendicular to the data storage medium 12. The graphs are normalized to the saturation magnetization during magnetization reversal. The magnetization transition between stable states in the free layer 52 occurs under a realistic gradient field from transition on a modern longitudinal magnetic media with shielding around the sensor. The graphs show the effect of varying bias field on switching time. In FIG. 6(a), the bias field is 0 Oe; in FIG. 6(b), the bias field is 100 Oe; in FIG. 6(c), the bias field is 200 Oe; in FIG. 6(d), the bias field is 300 Oe. As the bias field increases from 0 Oe to 300 Oe, the switching time decreases from 0.9 ns to 0.25 ns. The sensor efficiency may be measured by the change in the amplitude of the component of free layer 52 magnetization perpendicular to the data storage medium 12. This amplitude decreases from 0.95 of saturation magnetization with a bias field of 0 Oe down to 0.7 of saturation magnetization with a bias field of 300 Oe. Therefore, using a 300 Oe biasing field decreased the signal amplitude by approximately 23%, but also decreased the switching time by a factor greater than three.

Figure 7:
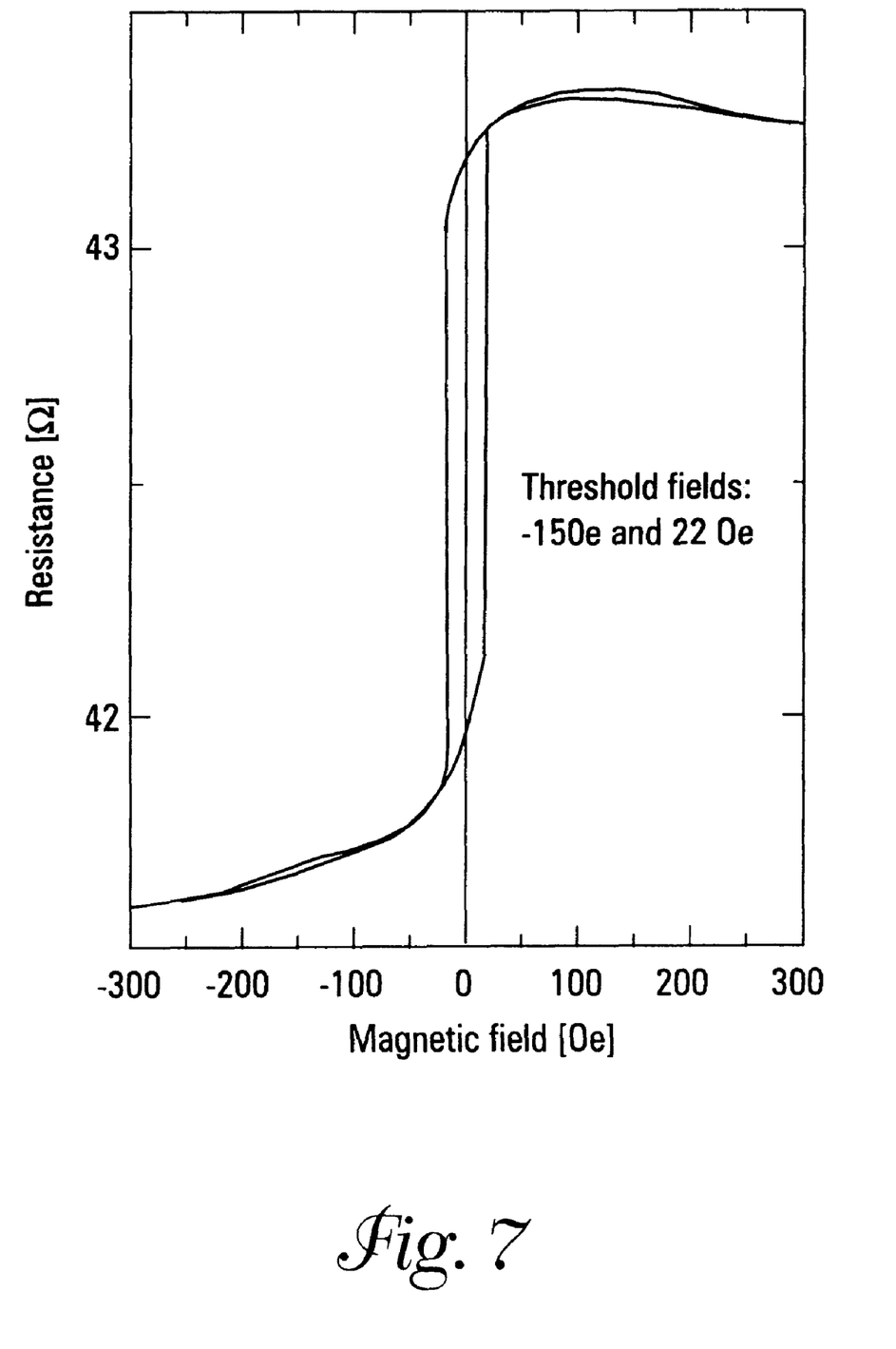
FIG. 7 is a graph of the switching response of a magnetoresistive sensor in accordance with the invention.

FIG. 7 shows experimental data for a low field transfer curve for a tunneling magnetoresistive sensor with shape anisotropy perpendicular to the storage medium 12 and a magnetic field generator in the form of permanent magnets. The sensor switches at threshold fields of −15 Oe and 21 Oe. The effective efficiency is approximately 50%. With 300 mV applied voltage to drive the sense current through the sensor, the sensor produces approximately a 12 mV signal in external field range 300 Oe. Spin stand testing of the magnetoresistive sensor showed that the sensor provides a low frequency averaged amplitude (LFAA) of 6 mV. The ratio of high frequency averaged amplitude to low frequency averaged amplitude (HFAA/LFAA) was aproximately 76%. The asymmetry, i.e. the ratio between the positive and negative pulse amplitudes of the signal, was 1.05.

A number of embodiments of the invention have been described. Nevertheless, it will be understood that various modifications may be made without departing from the spirit and scope of the invention. For example, magnetic field detection can be based on the giant magnetoresistive current-in-plane principle, giant magnetoresistive current-perpendicular to plane principle, tunneling magnetoresistance, or any other principle which is based on the magnetoresistive response of the sensor to an applied magnetic field. Accordingly, other embodiments are within the scope of the following claims.

What is claimed is:

1. A magnetoresistive sensor for sensing a magnetic storage medium having data stored thereon in the form of varying magnetic data fields, comprising:
   a free layer having a magnetic anisotropy that supports a first and a second stable magnetic state;
   a magnetic field generator to bias the free layer and cause the first stable magnetic state to rotate to a first biased stable magnetic state and the second stable magnetic state to rotate to a second biased stable magnetic state, wherein the free layer switches between the first and second biased stable magnetic states in response to the magnetic data fields on the magnetic storage medium; and
   a pinned layer proximate to a conducting spacer and wherein the free layer is proximate to the conducting spacer, the pinned layer having a magnetic orientation approximately perpendicular to the first stable state of the free layer.

2. The magnetoresistive sensor of claim 1, wherein the magnetic field generator comprises a permanent magnet.

3. The magnetoresistive sensor of claim 2, wherein the permanent magnet has a magnetic field orientation parallel to the magnetic field orientation of the pinned layer.

4. The magnetoresistive sensor of claim 3, wherein the wherein the permanent magnet is positioned adjacent to the free layer.

5. The magnetoresistive sensor of claim 4, wherein the free layer is oriented in a plane and the permanent magnet is oriented perpendicular to the plane of the free layer.

6. The magnetoresistive sensor of claim 1 wherein a magnetic data field greater than a positive threshold causes the free layer to enter the first biased stable state, and wherein a magnetic data field below a negative threshold causes the free layer to enter the second biased stable state.

7. The magnetoresistive sensor of claim 6 wherein the absolute value of the strength of the magnetic data field necessary to cause a transition in the free layer between the first biased stable state and the second biased stable state is less than the absolute value of the strength of the magnetic data field necessary to cause a transition in the free layer between the first stable state and the second stable state.

8. The magnetoresistive sensor of claim 7 wherein the time required for the free layer to switch between first and second stable biased magnetic states is less than the time required for the free layer to switch between first and second stable magnetic states.

9. A magnetoresistive sensor for sensing a magnetic storage medium having data stored thereon in the form of varying magnetic data fields, comprising:
   a free layer having a magnetic anisotropy that supports a first and a second stable magnetic state; and
   a magnetic field generator to bias the free layer and cause the first stable magnetic state to rotate to a first biased stable magnetic state and the second stable magnetic state to rotate to a second biased stable magnetic state, wherein the free layer switches between the first and second biased stable magnetic states in response to the magnetic data fields on the magnetic storage medium, wherein the magnetic field generator comprises an alternating current source.

10. The magnetoresistive sensor of claim 9, wherein the alternating current source produces a current that is applied to the free layer by means of a current stripe positioned proximate to the free layer.

11. The magnetoresistive sensor of claim 10, wherein the alternating current source produces a sinusoidally-varying current.

12. The magnetoresistive sensor of claim 9, wherein the alternating current source produces an electrical current that flows through the free layer.

13. The magnetoresistive sensor of claim 12, wherein the alternating current source produces a sinusoidally-varying current.

14. The magnetoresistive sensor of claim 9, wherein the magnetic data fields have cyclic variations and wherein the alternating current source current is activated at a rate that corresponds to the rate of cyclic variations in the data stored on the magnetic storage medium.

15. The magnetoresistive sensor of claim 9 wherein a magnetic data field greater than a positive threshold causes the free layer to enter the first biased stable state, and wherein a magnetic data field below a negative threshold causes the free layer to enter the second biased stable state.

16. The magnetoresistive sensor of claim 15 wherein the absolute value of the strength of the magnetic data field necessary to cause a transition in the free layer between the first biased stable state and the second biased stable state is less than the absolute value of the strength of the magnetic data field necessary to cause a transition in the free layer between the first stable state and the second stable state.

17. The magnetoresistive sensor of claim 16 wherein the time required for the free layer to switch between first and second stable biased magnetic states is less than the time required for the free layer to switch between first and second stable magnetic states.

18. A magnetoresistive sensor for sensing a magnetic storage medium having data stored thereon in the form of varying magnetic data fields, comprising:
   a free layer having a magnetic anisotropy that supports a first and a second stable magnetic state; and
   a magnetic field generator to bias the free layer and cause the first stable magnetic state to rotate to a first biased stable magnetic state and the second stable magnetic state to rotate to a second biased stable magnetic state, wherein the free layer switches between the first and second biased stable magnetic states in response to the magnetic data fields on the magnetic storage medium, wherein the magnetic field generator comprises a permanent magnet and an alternating current source.

19. The magnetoresistive sensor of claim 18, wherein the magnetic data fields have cyclic variations and wherein the alternating current source current is activated at a rate that corresponds to the rate of cyclic variations in the data stored on the magnetic storage medium.

20. An apparatus for reading magnetic data fields on a magnetic storage medium comprising:
   a conducting spacer;
   a free layer having a magnetic anisotropy that supports a first and a second stable magnetic state;
   a pinned layer having a fixed magnetic orientation perpendicular to the first and second stable states;
   the free layer, the conducting spacer, and the pinned layer arranged in a laminate with the conducting spacer forming the middle layer of the laminate;
   a magnetic field generator to bias the free layer and cause the first stable magnetic state to rotate to a first biased stable magnetic state and the second stable magnetic state to rotate to a second biased stable magnetic state, wherein the free layer switches between the first and second biased stable magnetic states in response to the magnetic data fields on the magnetic storage medium; and
   readback circuitry in communication with the magnetoresistive sensor that determines the value of the magnetic data fields based upon the magnetic state of the magnetoresistive sensor.

21. A data storage system, comprising:
   a magnetic storage medium having data stored thereon in the form of varying magnetic data fields;
   a magnetoresistive sensor maintained proximate to the storage medium during relative motion between the magnetoresistive sensor and the storage medium; the magnetoresistive sensor comprising a free layer, the free layer having a magnetic anisotropy that supports first and second stable magnetic states;
   an alternating current source for biasing the free layer and causing the first stable magnetic state to rotate to a first biased stable magnetic state and the second stable magnetic state to rotate to a second biased stable magnetic state, wherein the free layer switches between the first and second biased stable magnetic states in response to the magnetic data fields on the magnetic storage medium; and
   readback circuitry in communication with the magnetoresistive sensor that determines the value of the data based upon the magnetic state of the magnetoresistive sensor.

22. A method of sensing data stored in sectors on a magnetic medium in the form of varying magnetic fields with a magnetoresistive sensor having a free layer, the free layer having a magnetic anisotropy that supports first and second stable magnetic states, the method comprising the steps of:
   magnetically biasing the free layer wherein the first stable magnetic state rotates to a first biased stable magnetic state and the second stable magnetic state rotates to a second biased stable magnetic state;
   positioning the sensor proximate to a sector of the magnetic medium to be sensed; removing the magnetic bias wherein the first biased stable magnetic state rotates to the first stable magnetic state and the second biased stable magnetic state rotates to the second stable magnetic state;
   sensing the magnetic state of the free layer while the magnetic bias is removed.

23. The method of claim 22 further comprising the step of performing repetitively the steps of claim 22.

24. The method of claim 22 wherein the data has cyclic variations and wherein the step of magnetically biasing the free layer is repetitively performed at a rate that corresponds to the rate of cyclic variations in the data.

25. The method of claim 22 wherein the step of magnetically biasing the free layer further comprises the step of activating an alternating current course.

26. The method of claim 22 wherein the magnetoresistive sensor has a magnetic field generator that provides a constant magnetic bias to the free layer, wherein the constant magnetic bias reduces the magnitude of the bias applied in the step of magnetically biasing the free layer to rotate the stable magnetic states to the biased stable magnetic states.

27. An apparatus for reading magnetic data fields on a magnetic storage medium comprising:
   a free layer having a magnetic anisotropy that supports a first and a second stable magnetic state;
   a magnetic field generator to bias the free layer and cause the first stable magnetic state to rotate to a first biased stable magnetic state and the second stable magnetic state to rotate to a second biased stable magnetic state, wherein the second stable magnetic state is at least one of parallel or anti-parallel to the first stable magnetic state and an angle between the first biased stable magnetic state and the second biased stable magnetic state is less than 180 degrees; and wherein the free layer switches between the first and second biased stable magnetic states in response to the magnetic data fields on the magnetic storage medium;
   a conducting spacer; and
   a pinned layer having a fixed magnetic orientation perpendicular to the first and second stable states, the free layer, the conducting spacer, and the pinned layer arranged in a laminate with the conducting spacer forming the middle layer of the laminate.

28. The apparatus of claim 27 further comprising:
   a readback circuitry in communication with the magnetoresistive sensor that determines the value of the magnetic data fields based upon the magnetic state of the magnetoresistive sensor.

* * * * *